United States Patent
Miki et al.

(10) Patent No.: US 8,626,416 B2
(45) Date of Patent: Jan. 7, 2014

(54) TRACTION CONTROLLING APPARATUS

(75) Inventors: Kotaro Miki, Wako (JP); Takeru Abe, Wako (JP); Masanori Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 13/427,059

(22) Filed: Mar. 22, 2012

(65) Prior Publication Data

US 2012/0245818 A1 Sep. 27, 2012

(30) Foreign Application Priority Data

Mar. 25, 2011 (JP) .................. 2011-067338

(51) Int. Cl.
*B60T 7/12* (2006.01)
*G05D 1/00* (2006.01)
*G06F 7/00* (2006.01)

(52) U.S. Cl.
USPC .......................................................... 701/85

(58) Field of Classification Search
USPC .......................................................... 701/85
See application file for complete search history.

(56) References Cited

U.S. PATENT DOCUMENTS

| | | | | |
|---|---|---|---|---|
| 4,858,715 A | * | 8/1989 | Tominaga | 180/170 |
| 4,942,950 A | * | 7/1990 | Watanabe et al. | 477/87 |
| 4,947,952 A | * | 8/1990 | Kajiwara | 180/178 |
| 5,241,478 A | * | 8/1993 | Inoue et al. | 701/91 |
| 5,329,453 A | * | 7/1994 | Tsuyama et al. | 701/83 |

FOREIGN PATENT DOCUMENTS

JP 06-229263 A 8/1994

* cited by examiner

*Primary Examiner* — Mary Cheung
*Assistant Examiner* — Frederick Brushaber
(74) *Attorney, Agent, or Firm* — Squire Sanders (US) LLP

(57) ABSTRACT

A traction controlling apparatus is configured such that if a slip of a driving wheel is detected, then a throttle valve opening is reduced to a first predetermined value. If failure is detected while the throttle valve opening is reduced to the first predetermined value, then the throttle valve opening is further reduced to a second predetermined value. If the acceleration grip is manipulated to a fully closed position while the throttle valve opening is reduced to the second predetermined value, then the control is ended and throttle control by a direct manipulation of the acceleration grip is enabled.

19 Claims, 8 Drawing Sheets

FIG. 8
<TCS INDICATOR LIGHTING CONDITIONS>

| SYSTEM STATE | TCS INDICATOR | TCS-OFF INDICATOR |
|---|---|---|
| TILL INITIAL DIAGNOSIS COMPLETION UPON IGN ON | ON | ON |
| DURING NORMAL TRAVELING | OFF | OFF |
| DURING TC CONTROL | FLICKERING | OFF |
| UPON TCS OFF | OFF | ON |
| UPON TCS FAIL | ON | OFF |
| ECU-METER COMMUNICATION DISCONNECTION (FAIL) | ON | OFF |

TRACTION CONTROLLING APPARATUS

BACKGROUND

1. Field

The present invention relates to a traction controlling apparatus, and particularly to a traction controlling apparatus capable of rapidly coping with recovery from failure which occurs during traction control.

2. Description of the Related Art

In a motorcycle or a four-wheeled vehicle, traction control for preventing slippage of a tire upon starting or upon acceleration is known, and also a countermeasure where failure occurs during traction control has been investigated. For example, in Patent Document 1 (Japanese Patent Laid-Open No. Hei 06-229263), a fail-safe apparatus is proposed in which, where failure of a traction controlling system is detected upon autonomous traveling wherein throttle control is carried out without depending upon an acceleration pedal operation, current to a throttle valve (sub throttle valve) for traction control is blocked so that the sub throttle valve is closed. In the fail-safe apparatus, after the sub throttle valve is closed, the opening of the throttle valve is recovered by a switching off manipulation for an autonomous traveling selection switch by the user.

The fail safe apparatus disclosed in Patent Document 1 has a configuration in which, when failure occurs, the throttle valve is operated in a closing direction to secure necessary and minimum driving by an idling controlling system. However, in the apparatus of Patent Document 1, recovery from an idling controlling mode to a normal throttle controlling mode cannot be achieved before the user carries out a switching off manipulation of the autonomous traveling selection switch. In such conventional control as just described, for example, even if one of wheel rotational speed sensors fails and traction control is disabled, if the failure is failure in which driving in the normal throttle controlling mode can be carried out, then the throttle valve opening remains in a fully closed state and inconvenient traveling or manipulation by excessive coping with the failure is imposed on the user. Particularly with a motorcycle which is likely to be influenced by an ignition noise or the like, there is a subject that, even if a temporary fail state of a sensor occurs, driving is excessively restricted by continuation of such a fail safe mode that a power supply is blocked upon fail detection of the traction controlling system.

It is an object of the present invention to provide a traction controlling apparatus which can quickly enter normal throttle valve control without excessively restricting the traveling state when failure occurs during traction control.

SUMMARY

In order to attain the object described above, according to embodiments of the present invention, a traction controlling apparatus includes a transmission or transmission means for transmitting a manipulation of an acceleration grip to a throttle valve through an electromagnetic connection unit. An accelerator opening sensor is configured to detect a manipulation opening of the acceleration grip. A throttle-by-wire controlling unit is configured to drive, in a state in which the electromagnetic connection unit is placed in a de-energization state to disconnect the transmission, an actuator in response to the manipulation opening of the acceleration grip to control an opening of the throttle valve. A slip detection unit is configured to detect a slip state of a driving wheel, and a fail detection unit is configured to detect failure of an engine controlling system. A throttle reduction unit is configured to reduce the throttle valve opening to a first predetermined value by the throttle-by-wire controlling unit in response to detection of a slip state and traction fail controlling unit configured to decrease, when failure of the engine controlling system is detected while the throttle valve opening is reduced to the first predetermined value, the throttle valve opening to a second predetermined value lower than the first predetermined value by the throttle-by-wire controlling unit. If it is detected that the acceleration grip is manipulated to a fully closed position during a traction fail process in which the throttle valve opening is reduced to the second predetermined value by the traction fail controlling unit, then the traction fail process is ended and the electromagnetic connection unit is energized to place the transmission into a connection state and throttle control based on the throttle valve opening in response to the acceleration manipulation opening is enabled.

Further, according to embodiments of the present invention, the second predetermined value can be an idling throttle valve opening.

Further, according to embodiments of the present invention, a traction indicator for indicating that the driving power is being suppressed and the traction fail process is being carried out is provided.

Further, according to embodiments of the present invention, the traction indicator is provided in a meter apparatus which indicates a driving state of a vehicle and is configured from a traction on indicating lamp which flickers during traction control but is turned off during stopping of the traction control and a traction off indicating lamp which is turned off during the traction control but is turned on during stopping of the traction control, and, during the traction fail process, the traction on indicating lamp is turned on and the traction off indicating lamp is turned off.

Further, according to embodiments of the present invention, the predetermined closing manipulation is a manipulation of the acceleration grip to a fully closed position.

Further, according to embodiments of the present invention, the traction controlling apparatus further includes transmission means for transmitting a manipulation of the acceleration grip to a throttle valve through electromagnetic connection means, and if it is detected that the predetermined closing manipulation is carried out for the acceleration grip during the traction process in which the throttle valve opening is reduced to the second predetermined value, then the traction fail process is stopped and the electromagnetic connection means is biased to place the transmission means into a connected state to enable throttle control based on the throttle valve opening in response to the acceleration manipulation opening.

Further, according to embodiments of the present invention, throttle valve opening control is executed when a slip ratio of the driving wheel is lower than a predetermined value. If the slip ratio becomes equal to or higher than the predetermined value, then fuel injection reduction control irrespective of the throttle valve opening is executed in addition to the throttle valve opening control, and, where the traction fail process is executed in a state in which the slip ratio is equal to or higher than the predetermined value, the fuel injection reduction control is ended and fuel injection control in response to the throttle valve opening is carried out.

According to certain of these embodiments, even if failure in which throttle control by normal acceleration operation can be carried out occurs during traction control, throttle control is enabled by carrying out a manipulation for fully closing the acceleration grip. Therefore, it is possible to prevent a burden by excessive coping with the failure such as a manipulation for restarting the system from being imposed on the driver.

Particularly, also it is possible to overcome the subject of the conventional technique that, when failure occurs, the engine can be driven only with the idling speed.

In certain embodiments, the engine can be maintained at the idling speed if the acceleration opening is not placed into the fully closed stage when failure occurs.

Also in certain embodiments, since the driver can recognize a situation in which the output power is suppressed by traction control and the traction fail process, it can be eliminated that a sense of incongruity by deceleration is given to the driver, and it is possible to urge the driver to transit to throttle control by a manipulation of the acceleration grip.

In some embodiments, since the fail indicator is formed by using the two displaying lights, the visibility of the indicator can be enhanced.

In certain embodiments, since the idling opening of the throttle and the opening of the acceleration grip can be associated with each other, a manipulation of the throttle valve opening in response to a manipulation of the acceleration grip can thereafter be carried out quickly.

In certain embodiments, since fuel injection in response to the throttle valve opening is carried out before a closing manipulation of the acceleration grip is carried out, air fuel ratio control can be entered quickly in accordance with throttle valve opening control after the fail process comes to an end.

BRIEF DESCRIPTION OF THE DRAWINGS

FIG. 8 is a view illustrating lighting conditions of a traction fail controlling indicator.

DETAILED DESCRIPTION

Figure 1:
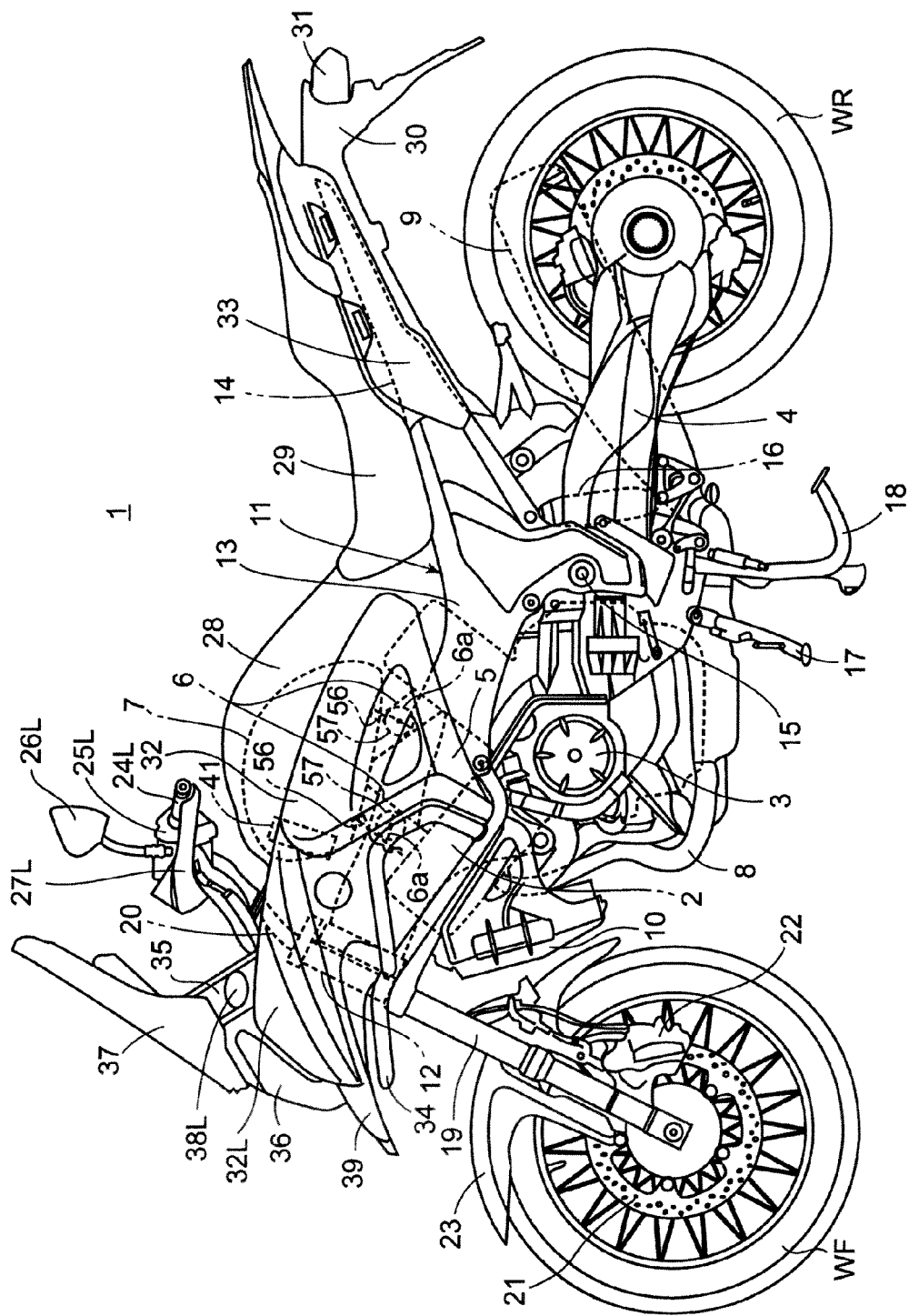
FIG. 1 is a left side elevational view of a motorcycle having a traction controlling apparatus according to an embodiment of the present invention.
Figure 2:
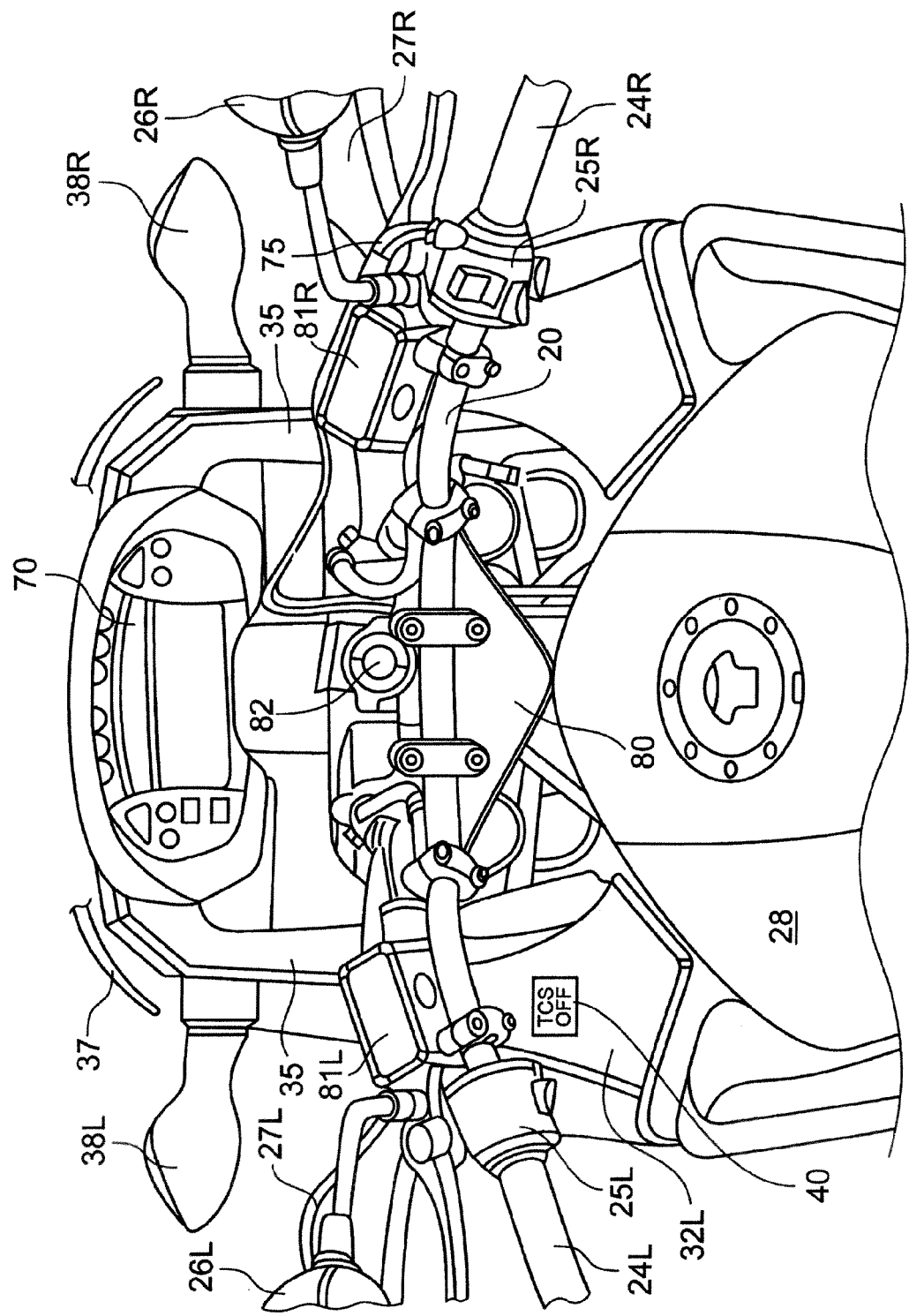
FIG. 2 is an enlarged view of a front portion of the motorcycle having the traction controlling apparatus according to the embodiment of the present invention.

In the following, an embodiment of the present invention is described with reference to the drawings. FIG. 1 is a left side elevational view of a motorcycle having a traction controlling apparatus according to an embodiment of the present invention, and FIG. 2 is an enlarged view of a front portion of the motorcycle. The motorcycle 1 has a water-cooled four-cycle V type four-cylinder engine 2, and power of the engine 2 is transmitted to a rear wheel WR which is a driving wheel by a shaft drive mechanism, built in a swing arm 4, through a speed change gear 3. The speed change gear 3 can change over between an automatic mode and a manual manipulation mode, and a hydraulic pressure type speed change mechanism having a plurality of clutches, for example a twin clutch, is adopted. A hydraulic system 5 of the speed change gear 3 is provided between cylinders of the engine 2 disposed in a state in which they are opened forwardly and rearwardly in a V shape. Between the front and rear cylinders provided in the engine 2, a throttle body 6 for accommodating a throttle valve 6a is provided above the hydraulic system 5. The throttle body 6 includes an actuator 57, such as a throttle motor, for the throttle valve 6a and a throttle valve opening sensor for detecting the opening of the throttle valve 6a in addition to the throttle valve 6. A fuel injection valve 56 is attached to the upstream side of the throttle valve 6a, that is, to the air cleaner side. An air cleaner 7 for cleaning air to be supplied to the engine 2 through the throttle body 6 is provided further above the throttle body 6. An ECU 41 is disposed in a recess formed at a front portion of the air cleaner 7. Exhaust pipes 8 led out from the front cylinders and the rear cylinders of the engine 2 are connected to a muffler 9 disposed at a vehicle body rear portion. A radiator 10 in which engine cooling water is circulated is provided in front of the engine 2.

A vehicle body frame 11 for supporting the engine 2, speed change gear 3, swing arm mechanism 4, hydraulic system 5, throttle body 6, air cleaner 7, exhaust pipes 8, muffler 9 described above and so forth is provided. The vehicle body frame 11 includes a head pipe 12 provided at a vehicle body front portion and extending in an upward and downward direction in a rearwardly inclined posture, a pair of left and right main frames 13 joined to the head pipe 12 and extending in a vehicle body rearward direction, and a seat frame 14 coupled to the main frame 13 and extending in a vehicle body rearward direction. The engine 2 and so forth are suspended on the main frame 13, and the swing arm 4 which has a shaft drive mechanism built therein is supported at a front portion thereof on the main frame 13 by a pivot 15 and is supported at an intermediate portion thereof on the seat frame 14 through a rear cushion 16. The rear wheel WR is supported at a rear portion of the swing arm 4. A side stand 17 and a main stand 18 are provided at a lower portion of the main frame 13.

A front fork 19 is coupled to a lower portion of a steering shaft (not shown) which extends upwardly and downwardly through the head pipe 12, and a steering handle bar 20 is coupled to a top ridge 80 provided at an upper end portion of the front fork 19. Hydraulic master cylinders 81L and 81R for front and rear brakes are provided at left and right portions of the steering handle bar 20, respectively, and an ignition switch 82 is disposed at a front portion of the center of the steering handle bar 20. A front wheel WF is supported for rotation at a lower end of the front fork 19. A brake disk 21 is provided for the front wheel WF, and a brake caliper 22 which hydraulically applies a braking action to the brake disk 21 is fixed to the front fork 19. Further, the front fork 19 supports a front fender 23 for covering an upper portion of the front wheel WF.

Grips 24L and 24R are provided at left and right ends of the steering handle bar 20, respectively, and the right side grip 24R is configured as an acceleration grip which can be rotated for an acceleration operation. An accelerator opening sensor for detecting a rotational angle or accelerator opening of the grip 24R is provided in a right side switch case 25R. The detected accelerator opening is transmitted as a throttle valve opening instruction to an ECU hereinafter described through a harness 75 and is utilized for control of the engine 2.

A left side switch case 25L and the right side switch case 25R are provided adjacent the grips 24L and 24R, respectively. Mirrors 26L and 26R are provided uprightly on the switch cases 25L and 25R, respectively. The knuckle guards 27L and 27R which cover the left and right grips 24L and 24R, respectively, are provided.

A fuel tank 28 is placed on the main frame 13, and a seat 29 which can include a driver's seat and a passenger seat integrated with each other is placed on the seat frame 14. A rear fender 30 which is positioned above the rear wheel WR is attached to a lower portion of the seat frame 14, and a tail lamp assembly 31 including a tail lamp, a rear winker or turn signal, a license lamp, and so forth, is attached to the rear fender 30.

To the vehicle body frame 11, a front cowl 32 and a rear cowl 33 which cover the outer side of the vehicle body frame 11 are attached. A front portion of the front cowl 32 is protected by a guard pipe 34 attached to the main frame 13. A pair of left and right stays 35 extend forwardly from the head pipe 12, and a head lamp 36, a windshield 37, front turn signals or winkers 38L and 38R and a meter apparatus 70 are attached by the stays 35. The front cowl 32 is expanded at a front portion thereof so as to configure a head lamp cover portion 39 which protects the head lamp 36 from below. The meter apparatus 70 can be disposed between the left and right stays 35.

The front cowl 32 is configured such that it connects leftwardly and rightwardly rearwardly from the head lamp cover portion 39 and extends round from the left and the right to an upper portion of the front fork 19. A traction control mode off switch (TCS off switch) is provided on an upper face of a site 32L of the front cowl 32 below the handle bar forwardly of the left side switch case 25L and the fuel tank 28 (refer to FIG. 2). The TCS off switch 40 is provided with an upper face thereof exposed from the site 32L and is disposed for pushing manipulation. While the TCS off switch 40 is kept depressed by a rider, it controls a TCS input port to the ECU 41 to the low level to stop operation of traction control.

Figure 3:
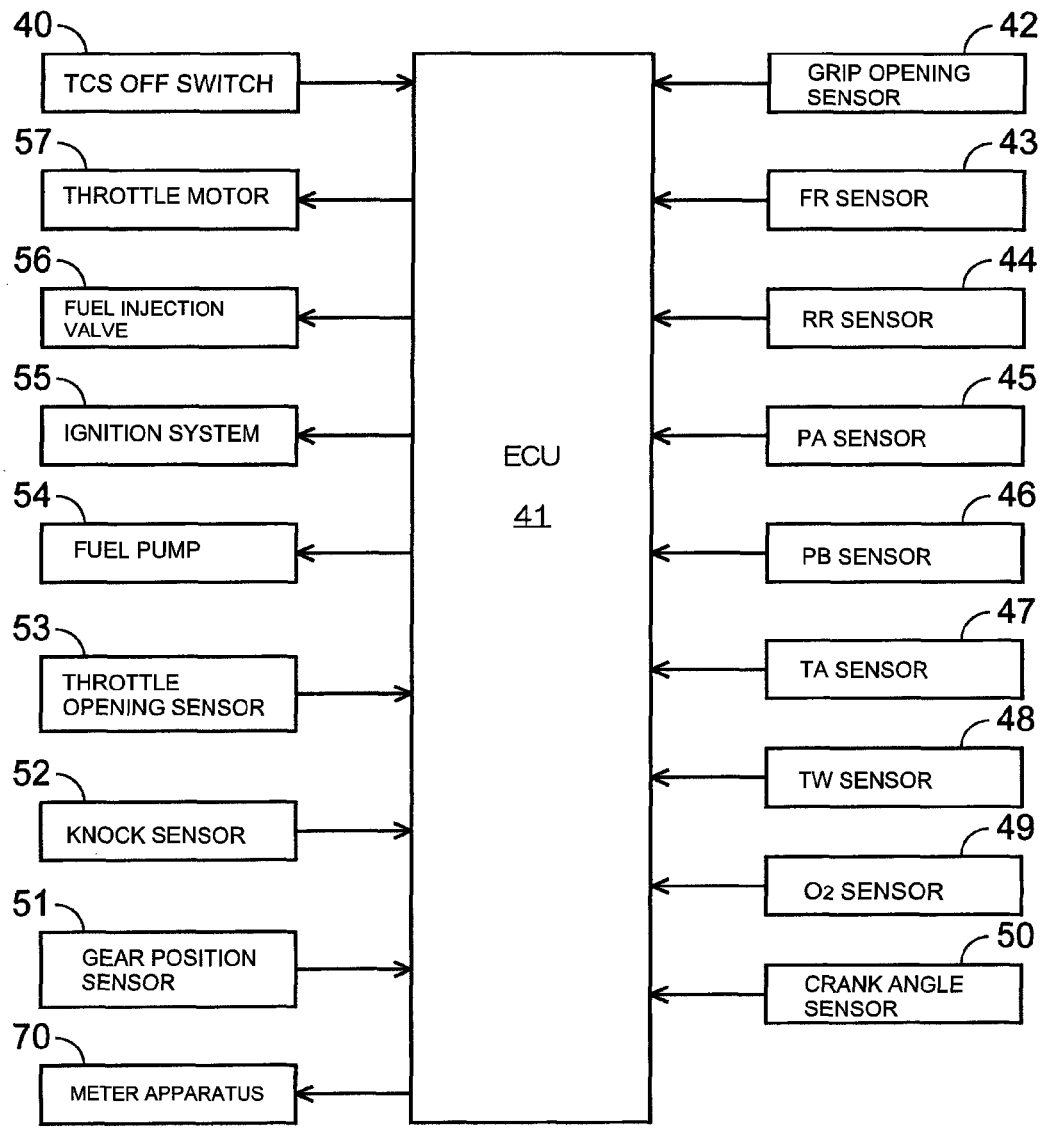
FIG. 3 is a wiring diagram between an engine and peripheral apparatus.

FIG. 3 is a wiring diagram between an engine ECU and peripheral apparatus. The ECU 41 includes a microcomputer and carries out traction control, ignition control, fuel injection control (FI control), throttle-by-wire control, meter displaying communication control, ABS control and so forth.

Various sensors to be used for control are provided. First, as sensors relating to the traction control, a grip opening sensor 42 for detecting a manipulation amount (accelerator opening) of the grip 24R, a front wheel rotational speed sensor (FR sensor) 43 and a rear wheel rotational speed sensor (RR sensor) 44 are provided. The front and rear wheel rotational speed sensors 43 and 44 are attached to the front wheel WF and the rear wheel WR, respectively, and each detects a plurality of slits formed in a pulser ring which rotates in synchronism with the wheel and outputs an on-off signal (or a high-low signal) using the detection signal as a trigger. The wheel rotational speeds detected by the front and rear wheel rotational speed sensors 43 and 44 are used also for the ABS control. As regards the traction control, the TCS off switch 40 for inhibiting the traction control is provided as described hereinabove.

As sensors relating to the ignition and FI controls, an atmospheric air pressure sensor (PA sensor) 45, an intake air negative pressure sensor (PB sensor) 46, an intake air temperature sensor (TA sensor) 47, a cooling water temperature sensor (TW sensor) 48, an oxygen concentration sensor (O2 sensor) 49, a crank angle sensor 50, a shift stage sensor (gear position sensor) 51, a knock sensor 52 and so forth are provided.

For the throttle-by-wire control, not only the grip opening sensor 42 but also a throttle valve opening sensor 53 for detecting the throttle valve opening are provided.

The various controls carried out by the ECU 41 are not independent of each other but are carried out in an associated relationship; therefore, the sensors are not necessarily provided for exclusive use for the individual controls but detection information of the sensors can be utilized commonly among plural ones of the controls.

Further, as the peripheral apparatus which operate in accordance with an instruction outputted from the ECU 41 based on the detection information of the sensors, a fuel pump 54, an ignition system 55, a fuel injection valve 56, a throttle motor (a DC brushless motor is used) 57, and the meter apparatus 70 described hereinabove are provided.

Figure 4:
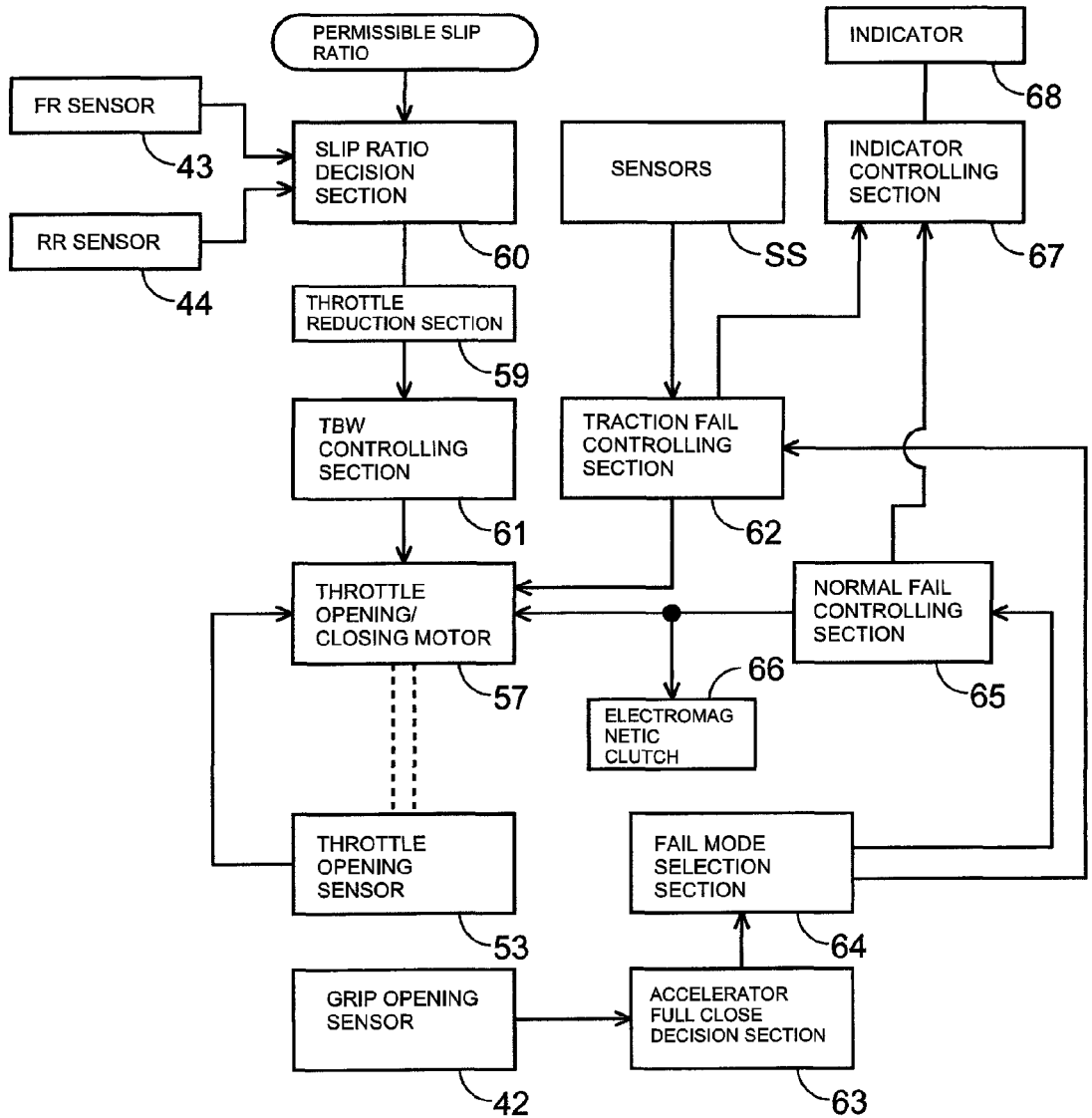
FIG. 4 is a block diagram showing functions of essential part of an ECU for a fail process during traction control.

A fail process in the traction control carried out by the ECU 41 is described. FIG. 4 is a block diagram showing principal functions of the ECU 41 for the fail control in the traction control. A slip ratio decision section 60 normally calculates a difference (that is, a slip ratio) between the rotational speeds of the front wheel WF and the rear wheel WR detected by the front and rear wheel rotational speed sensors 43 and 44, respectively, and urges, when the slip ratio exceeds a permissible slip ratio set in advance, a throttle reduction section 59 to cause a throttle-by-wire (TBW) controlling section 61 to carry out motor driving control instruction for reducing the throttle valve opening.

The throttle-by-wire controlling section 61 drives the throttle opening/closing motor 57 so that the slip ratio converges to the permissible slip ratio thereby to carry out torque suppression. If the slip ratio is extremely high, then the time between fuel injections may be subtracted to assist torque suppression.

A traction fail controlling section 62 detects abnormality of the various sensors (integrally indicated as "sensors SS" in the figure) to carry out a traction fail process. In the traction fail process, if failure of any sensor is detected during traction control, then the throttle valve opening is reduced to an idling speed opening. A accelerator full close decision section 63 detects that a fully closed state of the accelerator opening is detected by the grip opening sensor 42 in a state in which a fail process of reducing the throttle valve opening is being carried out, and inputs a traction fail stopping instruction to a fail mode selection section 64.

The fail mode selection section 64 changes over the processing by the traction fail controlling section 62 to processing by a normal fail controlling section 65 in response to the traction fail stopping instruction. The normal fail controlling section 65 carries out a normal fail process different from the traction fail process. In particular, in the normal fail process, the throttle-by-wire process is stopped but normal throttle control is carried out. More particularly, an electromagnetic clutch 66 is provided as turning on/off means for disconnecting a throttle cable, which transmits rotation of the acceleration grip 24R to the throttle valve, in the throttle-by-wire control but connecting the throttle cable in the normal throttle control. The electromagnetic clutch 66 may be disposed such that it can connect and disconnect the throttle cable in the throttle body 6.

Then, in the normal fail process, the electromagnetic clutch 66 is operated to the connection position to connect the throttle cable provided between the acceleration grip 24R and the throttle valve to carry out ordinary throttle control wherein the throttle valve is opened or closed in response to the manipulation opening of the acceleration grip 24R through the throttle cable. An indicator controlling section 67 carries out turning on, flickering and turning off control of a traction indicator 68 provided on the meter apparatus 70.

In the normal fail process, if any of the front and rear wheel rotational speed sensors 43 and 44, PB sensor 46, TA sensor, TW sensor 48 and shift stage sensor fails, then the normal throttle control is carried out, but if any of the fuel pump 54, a return spring of the throttle valve and a throttle-by-wire relay (a relay for supplying operation power from a vehicle-carried battery to the throttle-by-wire controlling apparatus) is placed into a failed state, then the traction control is stopped and the throttle valve opening is controlled to a scheduled low opening (for example, the idling opening). Failure of the return spring is a state in which the throttle valve does not return to the fully closed position, and a decision of the failure can be made depending upon the output of the throttle valve opening sensor 53. Meanwhile, failure of the throttle-by-wire relay can be decided from an abnormal voltage between positions across the relay.

Figure 5:
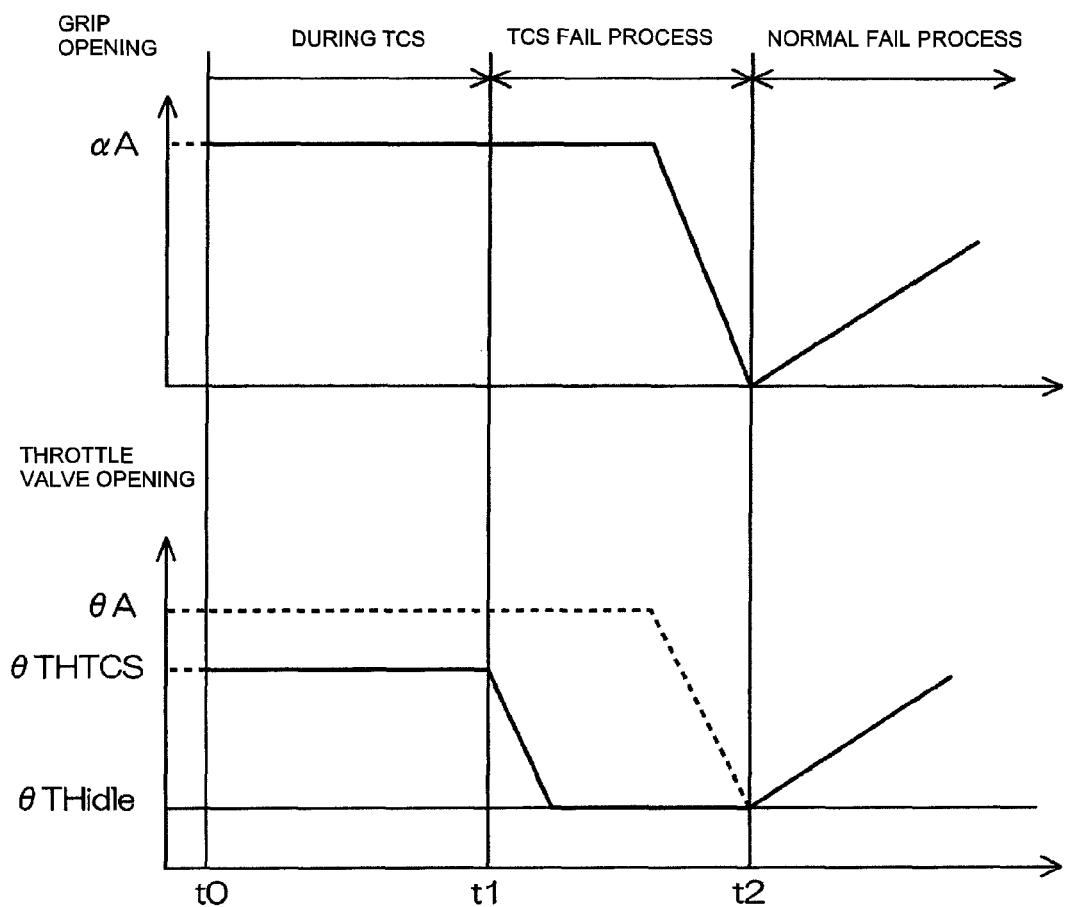
FIG. 5 is an operation timing chart relating to a traction fail process.

FIG. 5 is an operation timing chart relating to the traction fail process. In FIG. 5, the axis of abscissa is the time axis, and the axis of ordinate indicates the acceleration opening and the throttle valve opening. After the traction control is started (timing t0), the throttle valve opening θTH is limited to a TCS throttle valve opening θTHTCS smaller than a throttle valve opening θA determined from the accelerator opening αA irrespective of the grip opening αA. While the acceleration grip 24R remains open, this TCS throttle valve opening θTHTCS is maintained. If failure occurs during this traction control (timing t1), then the TCS throttle valve opening θTHTCS is reduced to the idling opening θTHidle. At this time, it is indicated by the traction indicator 68 that failure has occurred and the throttle valve opening is being suppressed. If the user manipulates the acceleration grip 24R to a position at which the throttle valve opening αA is the fully closed state in response to the indication (timing t2), then changeover from the traction fail control to the normal fail control is carried out, and control for converging the throttle valve opening to the throttle valve opening θTH corresponding to the accelerator opening αA is carried out.

Figure 6:
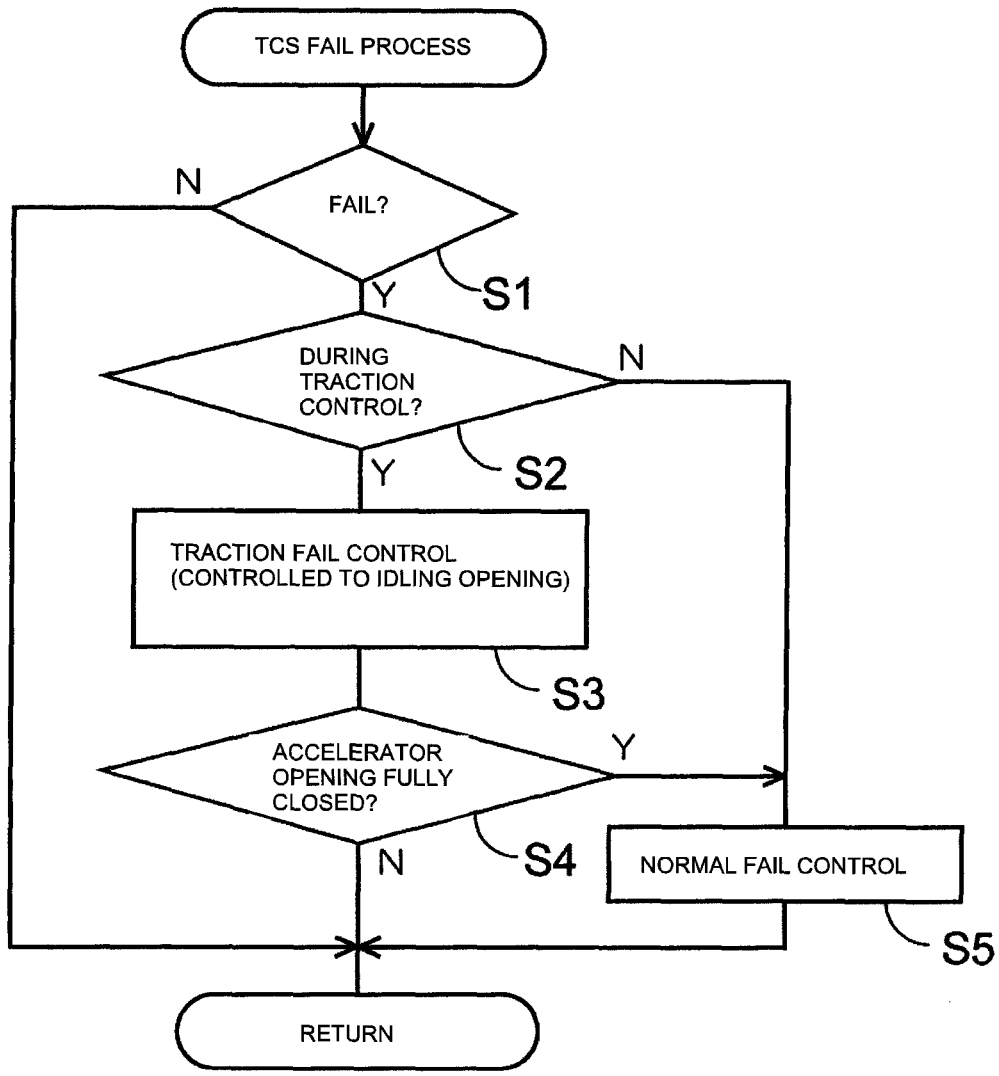
FIG. 6 is a flow chart of a process (TCS fail process) ready for a traction fail operation.

FIG. 6 is a flow chart of a process (TCS fail process) corresponding to the traction fail operation of FIG. 5. Referring to FIG. 6, at step S1, it is decided whether or not failure has occurred. If it is decided that failure has occurred, then the processing advances from step S1 to step S2, at which it is decided whether or not traction control is being executed. If traction control is being executed, then the processing advances from step S2 to step S3, at which traction control of reducing the throttle valve opening θTH to the idling opening θTHidle is carried out. If traction control is not being executed, then the processing advances from step S2 to step S5, at which normal fail control is carried out. At step S4, it is determined whether the acceleration grip 24R is in the fully closed state (whether the accelerator opening is fully closed) or not. If the acceleration grip 24R is in the fully closed state, then the processing advances from step S4 to step S5, at which normal fail control is carried out. If the acceleration grip 24R is not in the fully closed state, the processing of this flow chart is ended, and the processing returns to a main routine.

Figure 7:
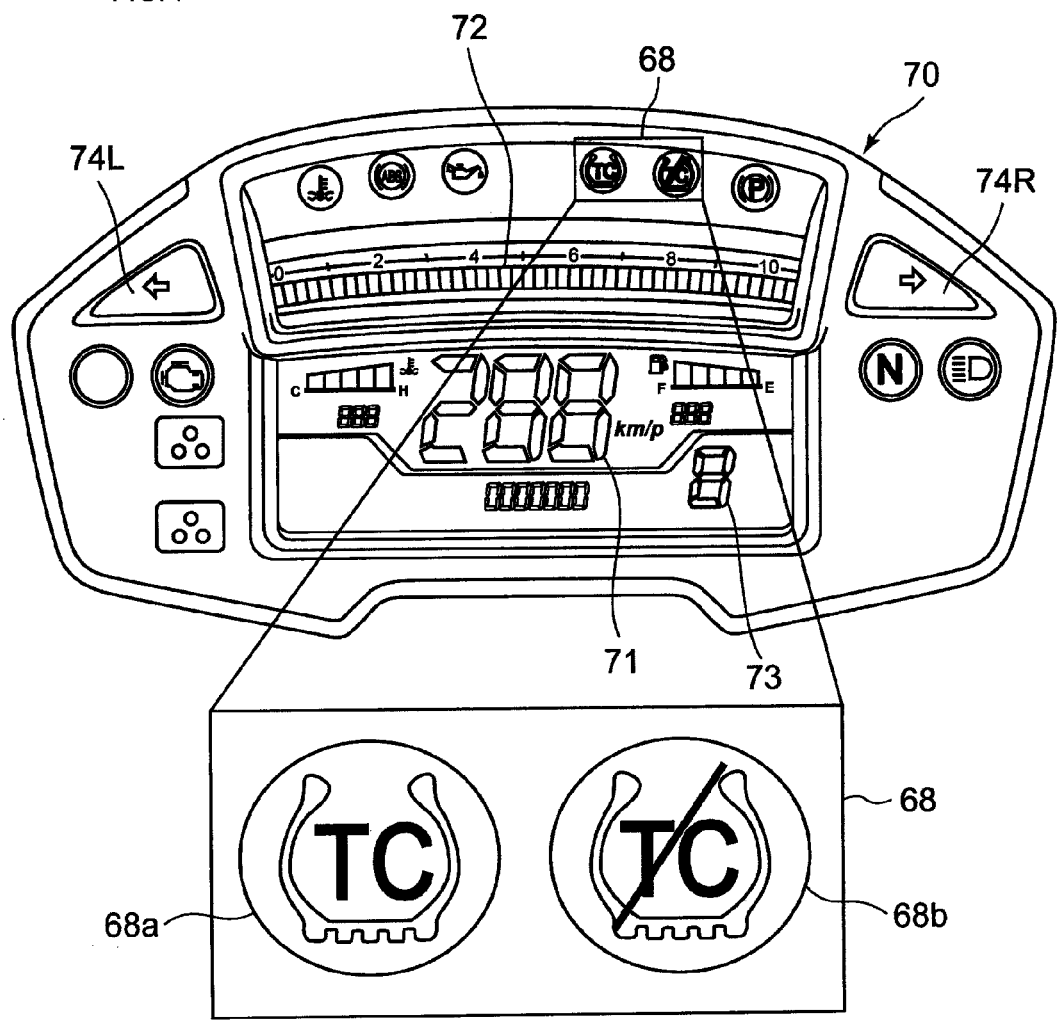
FIG. 7 is a front elevational view of a meter apparatus.

FIG. 7 is a front elevational view of the meter apparatus 70 and shows also an enlarged view of essential part. The meter apparatus 70 includes, in addition to the traction indicator 68, a vehicle speedometer 71, an engine tachometer 72, a shift stage display unit 73, left and right direction indicators 74L and 74R and so forth. The traction indicator 68 includes a traction-on (TCS) indicator 68a and a traction-off (TCS-OFF) indicator 68b each configured from an indicator such as an LED.

FIG. 8 is a view illustrating lighting conditions of the traction fail control indicator 68. Referring to FIG. 8, before the ignition switch is manipulated into an on state and a predetermined initial diagnosis of the system is completed, both of the TCS indicator 68a and the TCS-OFF indicator 68b are on, and during ordinary traveling of the motorcycle 1, both of the TCS indicator 68a and the TCS-OFF indicator 68b are off. Then, during traction control, the TCS indicator 68a is on and the TCS-OFF indicator 68b is off, but if the TCS off switch 40 is depressed, then the TCS indicator 68a is turned off and the TCS-OFF indicator 68b is turned on. Further, during traction fail control or when disconnection failure of the communication line between the ECU 38 and the meter apparatus 70 occurs, the TCS indicator 68a is turned on and the TCS-OFF indicator 68b is turned off. It is to be noted that, if the TCS off switch 40 is manipulated in a state in which traction control can be operated, the operation state of the traction control changes to a state in which traction control is rendered inoperative. However, if the TCS off switch 40 is manipulated while the traction control is in an inoperative state, then the traction control is placed into an operable state and the TCS indicator 68a and the TCS-OFF indicator 68b are turned off.

If a mark having a pattern same as a mark added to the TCS-OFF indicator 68b is added to a manipulation portion (depression portion) of the TCS off switch 40, then an incorrect manipulation can be prevented.

DESCRIPTION OF REFERENCE SYMBOLS

1 . . . Motorcycle, 24R . . . Acceleration grip, 40 . . . TCS off switch, 42 . . . Grip opening sensor, 57 . . . Actuator, 59 . . . Throttle reduction section, 60 . . . Slip ratio decision section, 61 . . . Throttle-by-wire controlling section, 68 . . . Indicator

The invention claimed is:

1. A traction controlling apparatus, comprising:
a grip opening sensor configured to detect a manipulation opening of an acceleration grip;
a throttle-by-wire controlling unit configured to drive an actuator in response to the manipulation opening of the acceleration grip to control an opening of a throttle valve;
a slip detection unit configured to detect a slip state of a driving wheel;
a fail detection unit configured to detect failure of an engine controlling system;
a throttle reduction unit configured to reduce the throttle valve opening to a first predetermined value by the throttle-by-wire controlling unit in response to detection of a slip state; and
a traction fail controlling unit configured to decrease, by the throttle-by-wire controlling unit, lower than the first predetermined value, when failure of the engine controlling system is detected while the throttle valve opening is reduced to the first predetermined value, wherein
when it is detected that predetermined closing manipulation is carried out for the acceleration grip during a traction fail process in which the throttle valve opening is reduced to the second predetermined value by the traction fail controlling unit, the traction fail process is ended and throttle control based on the throttle valve opening in response to the acceleration manipulation opening is enabled.

2. The traction controlling apparatus according to claim 1, wherein the second predetermined value comprises an idling throttle valve opening.

3. The traction controlling apparatus according to claim 1, further comprising a traction indicator configured to indicate that the driving power is being suppressed and the traction fail process is being carried out.

4. The traction controlling apparatus according to claim 3, wherein the traction indicator is provided in a meter apparatus which is configured to indicate a driving state of a vehicle and is configured from a traction ON indicating lamp which flickers during traction control and is turned off during stopping of the traction control and a traction OFF indicating lamp which is turned off during the traction control but is turned on during stopping of the traction control, and, during the traction fail process, the traction ON indicating lamp is turned on and the traction OFF indicating lamp is turned off.

5. The traction controlling apparatus according to claim 1, wherein the predetermined closing manipulation is a manipulation of the acceleration grip to a fully closed position.

6. The traction controlling apparatus according to claim 1, further comprising a transmission unit configured to transmit a manipulation of the acceleration grip to a throttle valve through an electromagnetic connection unit,
wherein when it is detected that the predetermined closing manipulation is carried out for the acceleration grip during the traction fail process in which the throttle valve opening is reduced to the second predetermined value, the traction fail process is stopped and the electromagnetic connection unit is biased to place the transmission unit into a connected state to enable throttle control based on the throttle valve opening in response to the acceleration manipulation opening.

7. The traction controlling apparatus according to claim 1, wherein throttle valve opening control is executed when a slip ratio of the driving wheel is lower than a predetermined value, and if the slip ratio becomes equal to or higher than the predetermined value, then fuel injection reduction control irrespective of the throttle valve opening is executed in addition to the throttle valve opening control, and where the traction fail process is executed in a state in which the slip ratio is equal to or higher than the predetermined value, the fuel injection reduction control is ended and fuel injection control in response to the throttle valve opening is carried out.

8. A traction controlling apparatus, comprising:
sensor means for detecting a manipulation opening of an acceleration grip;
throttle-by-wire controlling means for driving an actuator in response to the manipulation opening of the acceleration grip to control an opening of a throttle valve;
slip detection means for detecting a slip state of a driving wheel;
fail detection means for detecting failure of an engine controlling system;
throttle reduction means for reducing the opening of the throttle valve to a first predetermined value by the throttle-by-wire controlling means in response to detection of a slip state; and
traction fail controlling means for decreasing, by the throttle-by-wire controlling means, the opening of the throttle valve to a second predetermined value, lower than the first predetermined value, when failure of the engine controlling system is detected while the throttle valve opening is reduced to the first predetermined value,
wherein when it is detected that predetermined closing manipulation is carried out for the acceleration grip during a traction fail process in which the opening of the throttle valve is reduced to the second predetermined value by the traction fail controlling means, the traction fail process is ended and throttle control based on the opening of the throttle valve in response to the acceleration manipulation opening is enabled.

9. The traction controlling apparatus according to claim 8, wherein the second predetermined value comprises an idling throttle valve opening.

10. The traction controlling apparatus according to claim 8, further comprising traction indicator means for indicating that the driving power is being suppressed and the traction fail process is being carried out.

11. The traction controlling apparatus according to claim 10, wherein the traction indicator means is provided in a meter means for indicating a driving state of a vehicle, and is configured from a traction ON indicating lamp which flickers during traction control but is turned off during stopping of the traction control and a traction OFF indicating lamp which is turned off during the traction control but is turned on during stopping of the traction control, and during the traction fail process, the traction ON indicating lamp is turned on and the traction OFF indicating lamp is turned off.

12. The traction controlling apparatus according to claim 8, wherein the predetermined closing manipulation is a manipulation of the acceleration grip to a fully closed position.

13. The traction controlling apparatus according to claim 8, further comprising transmission means for transmitting a manipulation of the acceleration grip to a throttle valve through an electromagnetic connection means,
wherein when it is detected that the predetermined closing manipulation is carried out for the acceleration grip during the traction process in which the opening of the throttle valve is reduced to the second predetermined value, the traction fail process is stopped and the electromagnetic connection unit is biased to place the transmission unit into a connected state to enable throttle control based on the opening of the throttle valve in response to the acceleration manipulation opening.

14. The traction controlling apparatus according to claim 8, wherein the throttle valve opening control is executed when a slip value of the driving wheel is lower than a predetermined value, and if the slip ratio becomes equal to or higher than the predetermined value, then fuel injection reduction control irrespective of the opening of the throttle valve is executed in addition to the throttle valve opening control, and, where the traction fail process is executed in a state in which the slip ratio is equal to or higher than the predetermined value, the fuel injection reduction control is ended and the fuel injection control in response to the opening of the throttle valve is carried out.

15. A traction controlling method, comprising:
detecting a manipulation opening of an acceleration grip;
driving an actuator in response to the manipulation opening of the acceleration grip, to control an opening of a throttle valve;
detecting a slip state of a driving wheel;
detecting failure of an engine controlling system;
reducing the throttle valve opening to a first predetermined value in response to detection of a slip state;
decreasing, when failure of the engine controlling system is detected while the throttle valve opening is reduced to the first predetermined value, the throttle valve opening to a second predetermined value, lower than the first predetermined value;
ending a traction fail process when it is detected that predetermined closing manipulation is carried out for the acceleration grip during the traction fail process in which the throttle valve opening is reduced to the second predetermined value; and
enabling throttle control based on the throttle valve opening in response to the manipulation opening.

16. The traction controlling method according to claim 15, further comprising indicating that the driving power is being suppressed and the traction fail process is being carried out.

17. The traction controlling method according to claim 16, further comprising indicating a driving state of a vehicle with a traction ON indicating lamp which flickers during traction control and is turned off during stopping of the traction control and a traction OFF indicating lamp which is turned off during the traction control but is turned on during stopping of the traction control, and wherein during the traction fail process, the traction ON indicating lamp is turned on and the traction OFF indicating lamp is turned off.

18. The traction control method according to claim 15, wherein the detecting of the manipulation opening of the acceleration grip comprises detecting a transmitted manipulation of the acceleration grip to a throttle valve through an electromagnetic connection unit, and wherein when it is detected that the predetermined closing manipulation is carried out for the acceleration grip during the traction fail process in which the throttle valve opening is reduced to the second predetermined value, the traction fail process is stopped and the electromagnetic connection unit is biased to place the transmission unit into a connected state to enable throttle control based on the throttle valve opening in response to the acceleration manipulation opening.

19. The traction controlling method according to claim 15, wherein throttle valve opening control is executed when a slip ratio of the driving wheel is lower than a predetermined value, and if the slip ratio becomes equal to or higher than the predetermined value, then fuel injection reduction control irrespective of the throttle valve opening is executed in addition to the throttle valve opening control, and where the traction fail process is executed in a state in which the slip ratio is equal to or higher than the predetermined value, the fuel injection reduction control is ended and fuel injection control in response to the throttle valve opening is carried out.

* * * * *